United States Patent [19]

Okawa

[11] Patent Number: 5,567,790

[45] Date of Patent: *Oct. 22, 1996

[54] METHOD FOR THE PREPARATION OF DIPHENYLSILOXANE-DIMETHYLSILOXANE COPOLYMERS

[75] Inventor: Tadashi Okawa, Chiba Prefecture, Japan

[73] Assignee: Dow Corning Toray Silicone Co., Ltd., Tokyo, Japan

[ * ] Notice: The term of this patent shall not extend beyond the expiration date of Pat. No. 5,567,789.

[21] Appl. No.: 503,601

[22] Filed: Jul. 14, 1995

[30] Foreign Application Priority Data

Jul. 21, 1994 [JP] Japan ..................... 6-191075

[51] Int. Cl.$^6$ ................................. C08G 77/08
[52] U.S. Cl. ................ 528/18; 528/14; 528/21; 528/37
[58] Field of Search ................. 528/37, 14, 18, 528/21

[56] References Cited

U.S. PATENT DOCUMENTS 4,977,290 12/1990 Evans ........................ 556/459
5,169,920 12/1992 Okawa ....................... 528/34

FOREIGN PATENT DOCUMENTS 429928 6/1991 European Pat. Off. .
510873 6/1991 European Pat. Off. .

OTHER PUBLICATIONS

ACS Polymer Preprints 10 [2]pp. 1361–1367, 1969.

*Primary Examiner*—Melvyn I. Marquis
*Attorney, Agent, or Firm*—Alexander Weitz

[57] ABSTRACT

A highly efficient method for preparing a diphenylsiloxane-dimethylsiloxane copolymer having a narrow molecular weight distribution, said method comprising:

(I) polymerizing
  (A) a mixture of hexamethylcyclotrisiloxane and hexaphenylcyclotrisiloxane, using as polymerization initiator
  (B) a lithium compound having the formula

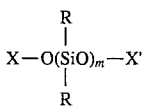

in which R independently denotes a monovalent hydrocarbon radical, X and X' are selected from the group consisting of hydrogen and lithium, with the proviso that one of X and X' must be lithium, and m is an integer having a value of at least 1, optionally, in the presence of
  (C) a molecular-weight regulator selected from the group consisting of water and a compound having the formula

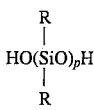

in which R has its previously defined meaning and p is an integer having a value of at least 1, said polymerization taking place in the presence of both
  (D) a nitrile compound and
  (E) an active hydrogen-free polar solvent; and
(II) terminating the polymerization reaction product from step (I) with a neutralizing agent selected from the group consisting of an acid and an organohalosilane.

13 Claims, No Drawings

METHOD FOR THE PREPARATION OF DIPHENYLSILOXANE-DIMETHYLSILOXANE COPOLYMERS

FIELD OF THE INVENTION

This invention relates to a novel method for the preparation of diphenylsiloxane-dimethylsiloxane copolymers.

BACKGROUND OF THE INVENTION

The properties of pure dimethylpolysiloxanes are favorably influenced in a number of ways by the introduction of the diphenylsiloxy group. The introduction of the diphenylsiloxy group is known to improve the radiation resistance, thermal resistance, noncombustibility, low-temperature flexibility, and so forth. Diphenylsiloxane-dimethylsiloxane copolymers have heretofore been prepared by the alkali metal-catalyzed ring-opening equilibration copolymerization of cyclic diphenylsiloxane and cyclic dimethylsiloxane.

One drawback to the application of this prior art has been that it gives large amounts of cyclic by-products at equilibrium, which reduces the yield of the copolymer product. This also makes control of the molecular weight problematic. Another drawback to the prior art occurs when water or an alpha,omega-dihydroxyoligosiloxane is used as endblocker for the purpose of producing copolymer terminated by silanol at both molecular chain ends. These silanol groups undergo dehydration condensation under the conditions used for copolymerization, which results in the production of only copolymer with a molecular weight much higher than expected.

The present inventor has already proposed a method for the preparation of diphenylsiloxane-dimethylsiloxane copolymers in U.S. Pat. No. 5,169,920. This method, which uses the lithium metal salt of organosilane or organopolysiloxane as polymerization initiator, discloses the nonequilibration polymerization of a mixture of hexaphenylcyclotrisiloxane and hexamethylcyclotrisiloxane followed by termination of the reaction. This polymerization is carried out in solvent at temperatures up to the boiling point of the solvent. Since this preparative method generates only small amounts of cyclic by-product, its copolymer yields are higher than in the conventional methods and it makes possible control of the molecular weight based on the total amount of polymerization initiator and molecular-weight regulator used. Moreover, since this polymerization is run at temperatures sufficiently low to substantially retard silanol group condensation, this method makes possible production of a silanol-endblocked copolymer while exercising control over the molecular weight. Nevertheless, this preparative method still does not provide complete inhibition of equilibration reactions and silanol condensation. As a result, it yields a copolymer product with a molecular weight somewhat higher than the calculated value and a broadened molecular weight distribution with the appearance of a shoulder on the high molecular weight side in gel permeation chromatography (GPC).

SUMMARY OF THE INVENTION

It has now been discovered that the addition of a nitrile compound to the above-described nonequilibration copolymerization system substantially restrains side reactions such as equilibration reactions and silanol condensation. This makes possible the production of copolymers having a narrow molecular weight distribution and a well-controlled molecular structure.

In specific terms, the present invention takes as its object the introduction of a high-yield method for preparing diphenylsiloxane-dimethylsiloxane copolymers that permits facile control of molecular weight and molecular structure and produces diphenylsiloxane-dimethylsiloxane copolymers with narrow molecular weight distributions.

The object of the present invention is achieved by a method for the preparation of diphenylsiloxane-dimethylsiloxane copolymers having the formula

Wherein Me hereinafter represents the methyl group, Ph hereinafter represents the phenyl group, R represents a monovalent hydrocarbon group, which may be the same or different, B is a hydrogen atom or an organosilyl group, r and s are each integers with values of at least 1, and t is an integer with a value of 0 or greater. The method comprises (I) polymerizing (A) a mixture of cyclic trisiloxanes with the formulas

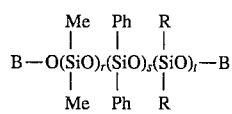 (i)

and

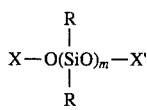 (ii)

using as a polymerization initiator (B) a lithium compound having the following formula

in which R is as defined above, X and X' can each be a hydrogen atom or lithium atom with the proviso that one of X and X' must be the lithium atom, and m is an integer with a value of at least 1, optionally, in the presence of (C) a molecular-weight regulator with the following formula

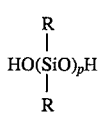

in which R is as defined above and p is an integer having a value of 0 or greater, said polymerization taking place in the presence of both (D) a nitrile compound and (E) active hydrogen-free polar solvent; and terminating the polymerization reaction using an acid or an organohalosilane. This method has been disclosed in Hei-6-191075 as filed in Japan on Jul. 21, 1994, the specification of which is hereby incorporated by reference.

DETAILED DESCRIPTION OF THE INVENTION

The cyclic trisiloxanes

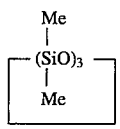 (i)

and

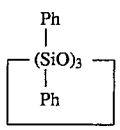 (ii)

of component (A) used by the present invention are already known as monomers for application in nonequilibration polymerizations. The hexamethylcyclotrisiloxane (i) to hexaphenylcyclotrisiloxane (ii) molar ratio is not crucial. However, the use of large proportions of hexaphenylcyclotrisiloxane results in increased amounts of cyclics produced by side reactions and unreacted hexaphenylcyclotrisiloxane, which in turn results in lower yields and compromises the ability to produce copolymer having component proportions corresponding to the reactants charged, the use of no more than 50 mole % hexaphenylcyclotrisiloxane is therefore preferred.

The lithium compound (B) used as polymerization initiator has the following formula.

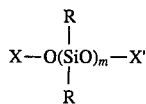

R in this formula represents a monovalent hydrocarbon group, which may be the same or may differ, and is exemplified by alkyl groups such as methyl, ethyl, propyl, and butyl; aryl groups such as phenyl, tolyl, and xylyl; aralkyl groups such as benzyl, and phenethyl; and alkenyl groups such as vinyl, allyl, butenyl, and hexenyl. X and X' can each be a hydrogen atom or lithium atom, but one of X and X' must be the lithium atom. The subscript m is an integer with a value of at least 1; preferably m is in the range from 1 to 20. Thus, component (B) encompasses monolithiated and dilithiated diorganosilanediols and monolithiated and dilithiated alpha,omega-dihydroxydiorganopolysiloxanes.

These compounds are exemplified as follows: monolithiated and dilithiated dimethylsilanediol, monolithiated and dilithiated diphenylsilanediol, monolithiated and dilithiated methylphenylsilanediol, monolithiated and dilithiated divinylsilanediol, monolithiated and dilithiated methylvinylsilanediol, monolithiated and dilithiated alpha,omega-dihydroxypolydimethylsiloxanes, monolithiated and dilithiated alpha,omega-dihydroxypolydiphenylsiloxanes, monolithiated and dilithiated alpha, omega-dihydroxymethylphenylpolysiloxanes, monolithiated and dilithiated alpha, omega-dihydroxypolydivinylsiloxanes, monolithjared and dilithiated alpha,omega-dihydroxypolymethylvinylsiloxanes, and the like.

Methods are already known for the preparation of these monolithiated and dilithiated diorganosilanediols and monolithiated and dilithiated alpha,omega-dihydroxydiorganopolysiloxanes. In one method, for example, the diorganosilanediol (or alpha,omega-dihydroxydiorganopolysiloxane) is first prepared by a careful hydrolysis with dilute aqueous base of the corresponding diorganodichlorosilane (or alpha, omega-dichlorodiorganopolysiloxane), and this intermediate is then lithiated by reaction with lithium metal, organolithium, lithium hydroxide, or lithium diisopropylamide. Another method provided as exemplary of this synthesis consists of the reaction of lithium hydroxide with cyclic trisiloxane.

The lithium compound polymerization initiator should be used in sufficient quantity to induce the ring-opening reaction, and it is preferably deployed in a quantity that provides values of 100:0 to 0.01:100 for the polymerization initiator (lithium compound):molecular-weight regulator (silanol compound or water, vide infra) molar ratio. Values of 0.5:99.5 to 50:50 of (B) to (C) are even more preferred for this molar ratio from the standpoint of productivity because they give good polymerization rates.

The molecular-weight regulator comprising the component (C) in the present invention can be the mixture of polymerization initiator and unreacted silanol-functional diorganosilanediol or unreacted silanol-functional alpha, omega-dihydroxydiorganopolysiloxane afforded by the preparation of polymerization initiator using fewer moles of organolithium than moles of silanol group. On the other hand, it may consist of a separate addition of fresh diorganosilanediol or alpha,omega-dihydroxydiorganopolysiloxane unrelated to the starting material for the polymerization initiator. The molecular-weight regulator therefore has the following formula.

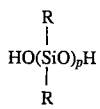

The subscript p in this formula is an integer with a value of 0 or greater, which means that water (p=0) may be used as molecular-weight regulator. R is as defined above.

Component (E), which comprises polar solvents that are free of active hydrogen, is added in order to promote the polymerization. Preferred as this polar solvent are tetrahydrofuran, 1,4-dioxane, ethylene glycol dimethyl ether, diethylene glycol dimethyl ether, dimethylformamide, dimethyl sulfoxide, and hexamethylphosphoramide. These solvents may be used as mixtures of two or more. The quantity of addition of the polar solvent cannot be specified in a simple manner because the ability to promote the polymerization varies from solvent to solvent. For example, based on the hexamethylcyclotrisiloxane content, the preferred ranges are 50 to 200 weight % for tetrahydrofuran, 0.5 to 5 weight % for dimethyl sulfoxide, and 1 to 20 weight % for dimethylformamide. Dimethylformamide is particularly preferred among the preceding based on a general consideration of the ability to promote the polymerization, ease of removal after termination of the polymerization, and economics. Polymerization is almost completely absent in the absence of subject active hydrogen-free polar solvent.

The nitrile compound (D) is added in the preparative method according to the present invention in order to inhibit side reactions during polymerization and reduce the content of low-molecular-weight siloxane. Said nitrile compounds (D) are exemplified by acetonitrile, propionitrile, succinonitrile, butyronitrile, isobutyronitrile, valeronitrile, alphatolunitrile, and the like. Mixtures of two or more nitriles may also be used. Among these nitriles, acetonitrile is the most preferred based on considerations of ease of removal after termination of the polymerization, economics, and toxicity. The weight ratio of (D) to (A) is preferably 0.01 to 10, more preferably 0.1 to 1.0.

The preparative method according to the present invention proceeds through the lithium compound (B)-induced nonequilibration polymerization (I) of the cyclic trisiloxane mixture (A) in the presence of nitrile (D) and polar solvent (E). The reaction temperature and reaction time must be carefully controlled during this process in order to avoid rearrangement reactions. When the polymerization is not a nonequilibration polymerization and becomes an equilibrium polymerization, copolymer with the expected molecular weight and molecular structure will no longer be obtained due to siloxane chain rearrangements and silanol group condensation.

Preferred reaction conditions for the above nonequilibration polymerization are a reaction time of 1 to 50 hours at a temperature of 0° C. to 60° C. This nonequilibration polymerization may be run without the use of solvent other than components (D) and (E), but it may also be run with the addition of aprotic nonpolar solvent, as exemplified by aromatic solvents such as toluene, xylene, and so forth, and aliphatic solvents such as hexane, heptane, cyclohexane, and the like.

The polymerization reaction is preferably implemented by monitoring the decrease of starting monomer (A) through, for example, gas chromatography (GLC), and terminating the reaction by the neutralization step (II) when the conversion has reached a specific or constant value. As a general rule, preferred conversions are 50 to 100%, while 70 to 100% is particularly preferred. When the conversion reaches 100%, the polymerization must be immediately terminated by the method discussed below in order to avoid the occurrence of the above-described side reactions.

The molecular weight of the copolymer product is determined in the preparative method according to the present invention by the ratio of polymerization initiator+molecular-weight regulator to cyclic trisiloxane consumed. Since the silanol group of the molecular-weight regulator used by the present invention undergoes a rapid and reversible exchange reaction with the lithium silanolate group of the polymerization initiator, the diorganosilanediol and alpha,omega-dihydroxydiorganopolysiloxane which are starting materials for the polymerization initiator may themselves be used as molecular-weight regulators.

Any neutralizing agent that will react with the lithium silanolate group to produce a stable lithium salt may be used to terminate the reaction. These neutralizing agents are exemplified by moist carbon dioxide; mineral acids such as hydrochloric acid, sulfuric acid, and so forth; carboxylic acids such as acetic acid, propionic acid, acrylic acid, and so forth; and functional organohalosilanes such as dimethylchlorosilane, dimethylvinylchlorosilane, methacryloxypropyldimethylchlorosilane, chloropropyldimethylchlorosilane, and so forth. Termination with moist carbon dioxide, mineral acid, and carboxylic acid yields silanol-endblocked polymer, while termination with organohalosilane yields endblocking silyl groups corresponding to the organohalosilane from which the halogen has been removed. Thus, termination by acid should be used when the introduction of silanol at both terminals of the copolymer product is desired, while termination with functionalized organohalosilane should be used when the introduction of silicon-bonded functional groups is desired. Moreover, various types of functional groups may be introduced by running a dehydrohalogenation reaction by the addition of the corresponding halosilane to the silanol-endblocked copolymer afforded by acid termination. It is recommended that this reaction be run in the presence of a hydrogen halide acceptor, such as an amine, etc. In addition, copolymer having the SiH functionality at both terminals can be prepared by using SiH-containing halosilane, such as dimethylchlorosilane, as the terminating agent. This diterminal-SiH-functional copolymer may also be used to prepare the corresponding diterminal-functionalized copolymer through hydrosilylation with organofunctionalized alkenyl compounds, such as allyl glycidyl ether, allylamine, allyl alcohol, trimethylolpropane monoallyl ether, glycerol monoallyl ether, allyl methacrylate, and the like. When this hydrosilylation reaction is run, the functional group should be protected as necessary with a protecting group such as trimethylsilyl, etc., and regenerated after completion of the reaction by removing the protective group.

The copolymer prepared as described hereinbefore has the following formula:

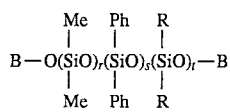

wherein Me, Ph, and R are as defined as above. B is a hydrogen atom or an organosilyl group, r and s are each integers with values of at least 1, and t is an integer with a value of 0 or greater.

EXAMPLES

The instant invention is explained in greater detail in the following through working examples. With reference to the chemical formulas, Me denotes the methyl group and Ph denotes the phenyl group. The number-average molecular weight and dispersity values reported in the examples were measured by gel permeation chromatography (GPC) calibrated with polystyrene standards. The dimethylformamide and acetonitrile were dried by standard methods prior to use. Unless indicated to the contrary, all procedures were carried out at room temperature (i.e., approximately 25° C.).

Example 1

8.64 g (21.8 moles) of alpha,omega-dihydroxyoligodimethylsiloxane (hydroxyl content=8.56 weight %) was placed in a four-neck flask. While stirring under a dry nitrogen atmosphere, 1 mL of a 1.71N hexane solution of n-butyllithium (1.71 mmoles) was added and the reaction was stirred for 1 minute at room temperature. This was followed by the introduction of 64.35 g (289.3 mmoles) of hexamethylcyclotrisiloxane, 21.6 g (36.3 mmoles) of hexaphenylcyclotrisiloxane, 75 g of toluene, 8 g of dimethylformamide, and 25 g of acetonitrile. When the hexamethylcyclotrisiloxane conversion by GLC had reached 98.7% after stirring for 4 hours at 50° C., 0.2 g of acetic acid was added in order to terminate the polymerization. Filtration and solvent removal under reduced pressure yielded a diphenylsiloxane-dimethylsiloxane copolymer. GPC (solvent: chloroform, detector: UV) gave a copolymer yield of 90.0%, a number-average molecular weight of 4,870 (calculated value=4,346), and a dispersity of 1.15. The remaining 10% was found to be oligomer produced by equilibration reactions. It was concluded that the extent of silanol condensation was less than in Comparative Example 1, vide infra, since the measured value of the molecular weight was closer to the calculated value than in Comparative Example 1 and the dispersity was narrower than in Comparative Example 1. In order to examine the degree of equilibration, the diphenylsiloxy group arrangement in the copolymer was examined by $^{29}$Si nuclear magnetic resonance analysis ($^{29}$Si NMR) with the following results:

D $\underline{P}$ D:P $\underline{P}$ D:P $\underline{P}$ P=38.4%:45.7%:15.9%.

wherein D denotes the dimethylsiloxy unit, P denotes the diphenylsiloxy unit, and the underlined unit is the unit under consideration. The isolated P unit (D $\underline{P}$ D) is presumed to be produced by siloxane chain equilibration reactions. Since its proportion is lower here than in Comparative Example 1, it may be concluded that less equilibration had occurred in the copolymer under consideration than in Comparative Example 1.

Example 2

A polymerization was run using the same charge proportions as in Example 1. In the present example, the polymerization was terminated by the addition of 0.2 g acetic acid when the hexamethylcyclotrisiloxane conversion had reached 97.7% after stirring for 2.5 hours at 40° C. and for an additional 7 hours and 10 minutes at 30° C. A diphenylsiloxane-dimethylsiloxane copolymer was then obtained by work up as in Example 1. GPC gave the following results: copolymer yield=90.5%, number-average molecular weight=4,611 (calculated value=4,346), and dispersity= 1.13. The remaining 9.5% was found to be oligomer produced by equilibration reactions. It was concluded that the extent of silanol condensation was less than in Comparative Example 1, vide infra, since the measured value of the molecular weight was closer to the calculated value than in Comparative Example 1 and the dispersity was narrower than in Comparative Example 1. The examination of the diphenylsiloxy group arrangement in the copolymer by $^{29}$Si NMR gave the following results:

D $\underline{P}$ D:P $\underline{P}$ D:P $\underline{P}$ P=36.9%:46.0%:17.0%.

Since the proportion of isolated P unit (D $\underline{P}$ D), which is presumed to be produced by siloxane chain equilibration reactions, is lower here than in Comparative Example 1, it may be concluded that less equilibration had occurred in the copolymer under consideration than in Comparative Example 1.

Comparative Example 1

A polymerization was run as in Example 1, but in the present case without the addition of the acetonitrile that was used in Example 1. The polymerization was terminated by the addition of 0.2 g acetic acid when the hexamethylcyclotrisiloxane conversion by GLC had reached 99.3% after stirring for 6 hours at 50° C. A diphenylsiloxane-dimethylsiloxane copolymer was then obtained by work up as in Example 1. GPC gave the following results: copolymer yield=83.8%, number-average molecular weight=5,565 (calculated value=4,346), and dispersity=1.20. The remaining 16.2% was found to be oligomer produced by equilibration reactions. It was concluded that the extent of silanol condensation was larger in the present case than in Examples 1 and 2 from the fact that the measured value of the molecular weight was shifted to a higher value relative to the calculated value than in Examples 1 and 2 and the dispersity was broader than in Examples 1 and 2. The examination of the diphenylsiloxy group arrangement in the copolymer by $^{29}$Si NMR gave the following results:

D $\underline{P}$ D:P $\underline{P}$ D:P $\underline{P}$ P=46.5%:39.0%:14.5%.

Since the proportion of isolated P unit (D $\underline{P}$ D), which is presumed to be produced by siloxane chain equilibration reactions, is higher here than in Examples 1 and 2, it may be concluded that more equilibration had occurred in the copolymer under consideration than in Examples 1 and 2.

That which is claimed is:

1. A method for preparing a diphenylsiloxane-dimethylsiloxane copolymer, said method comprising:
   (I) polymerizing
      (A) a mixture of hexamethylcyclotrisiloxane and hexaphenylcyclotrisiloxane,
   in the presence of
      (B) a lithium compound having the formula

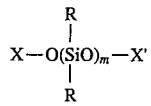

in which R independently denotes a monovalent hydrocarbon radical, X and X' are selected from the group consisting of hydrogen and lithium, with the proviso that one of X and X' must be lithium, and m is an integer having a value of at least 1,
   optionally, in the presence of
      (C) a molecular-weight regulator selected from the group consisting of water and a compound having the formula

in which R has its previously defined meaning and p is an integer having a value of at least 1,
   said polymerization taking place in the presence of both
      (D) a nitrile compound and
      (E) an active hydrogen-free polar solvent; and
   (II) terminating the polymerization reaction product from step (I) with a neutralizing agent selected from the group consisting of an acid and an organohalosilane.

2. The method according to claim 1, wherein R is independently selected from the group consisting of alkyl groups, aryl groups, aralkyl groups and alkenyl groups.

3. The method according to claim 2, wherein R is selected from the group consisting of methyl, phenyl and vinyl.

4. The method according to claim 3, wherein said solvent (E) is selected from the group consisting of tetrahydrofuran, 1,4-dioxane, ethylene glycol dimethyl ether, diethylene glycol dimethyl ether, dimethylformamide, dimethyl sulfoxide and hexamethylphosphoramide.

5. The method according to claim 4, wherein said nitrile compound (D) is selected from the group consisting of acetonitrile, propionitrile, succinonitrile, butyronitrile, isobutyronitrile, valeronitrile and alpha-tolunitrile.

6. The method according to claim 5, wherein said neutralizing agent is selected from the group consisting of moist carbon dioxide, hydrochloric acid, sulfuric acid, acetic acid, propionic acid and acrylic acid.

7. The method according to claim 5, wherein said neutralizing agent is selected from the group consisting of dimethylchlorosilane, dimethylvinylchlorosilane, methacryloxypropyldimethylchlorosilane and chloropropyldimethylchlorosilane.

8. The method according to claim 2, wherein said lithium compound (B) is selected from the group consisting of monolithiated and dilithiated dimethylsilanediol, monolithiated and dilithiated diphenylsilanediol, monolithiated and dilithiated methylphenylsilanediol, monolithiated and dilithiated divinylsilanediol, monolithiated and dilithiated methylvinylsilanediol, monolithiated and dilithiated alpha,omega-dihydroxypolydimethylsiloxanes, monolithiated and dilithiated alpha,omega-dihydroxypolydiphenylsiloxanes, monolithiated and dilithiated alpha,omega-dihydroxymethylphenylpolysiloxanes, monolithjared and dilithiated alpha,omega-dihydroxypolydivinylsiloxanes and monolithjared and dilithiated alpha,omega-dihydroxypolymethylvinylsiloxanes.

9. The method according to claim 8, wherein R is selected from the group consisting of methyl, phenyl and vinyl.

10. The method according to claim 9, wherein said solvent (E) is selected from the group consisting of tetrahydrofuran, 1,4-dioxane, ethylene glycol dimethyl ether, diethylene glycol dimethyl ether, dimethylformamide, dimethyl sulfoxide and hexamethylphosphoramide.

11. The method according to claim 10, wherein said nitrile compound (D) is selected from the group consisting of acetonitrile, propionitrile, succinonitrile, butyronitrile, isobutyronitrile, valeronitrile and alpha-tolunitrile.

12. The method according to claim 1, wherein said neutralizing agent is selected from the group consisting of moist carbon dioxide, hydrochloric acid, sulfuric acid, acetic acid, propionic acid and acrylic acid.

13. The method according to claim 1, wherein said neutralizing agent is selected from the group consisting of dimethylchlorosilane, dimethylvinylchlorosilane, methacryloxypropyldimethylchlorosilane and chloropropyldimethylchlorosilane.

* * * * *